United States Patent
Otsu et al.

(10) Patent No.: US 12,325,369 B2
(45) Date of Patent: Jun. 10, 2025

(54) IN-VEHICLE MANAGEMENT DEVICE AND MANAGEMENT METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Tomohiro Otsu, Yokkaichi (JP); Takeshi Hagihara, Yokkaichi (JP); Hirofumi Urayama, Yokkaichi (JP); Darmawan Go, Yokkaichi (JP); Yoshitaka Kikuchi, Yokkaichi (JP); Hideki Maeda, Yokkaichi (JP); Tatsuya Izumi, Osaka (JP); Hideyuki Tanaka, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 114 days.

(21) Appl. No.: 18/551,664

(22) PCT Filed: Mar. 17, 2022

(86) PCT No.: PCT/JP2022/012218
§ 371 (c)(1),
(2) Date: Sep. 21, 2023

(87) PCT Pub. No.: WO2022/209947
PCT Pub. Date: Oct. 6, 2022

(65) Prior Publication Data
US 2024/0166148 A1 May 23, 2024

(30) Foreign Application Priority Data
Mar. 31, 2021 (JP) .................................. 2021-059948

(51) Int. Cl.
*B60R 16/023* (2006.01)

(52) U.S. Cl.
CPC .............................. *B60R 16/0231* (2013.01)

(58) Field of Classification Search
None
See application file for complete search history.

(56) References Cited

U.S. PATENT DOCUMENTS

2004/0116822 A1* 6/2004 Lindsey ................. G01K 13/20
374/E1.004
2007/0058634 A1* 3/2007 Gupta ..................... H04L 67/12
370/392

(Continued)

FOREIGN PATENT DOCUMENTS

JP  2005-159864 A  6/2005
JP  2009-065412 A  3/2009

(Continued)

OTHER PUBLICATIONS

AUTOSAR CP R19-11, "Specification of UDP Network Management", AUTOSAR, Nov. 28, 2019.

(Continued)

*Primary Examiner* — Fekadeselassie Girma
(74) *Attorney, Agent, or Firm* — Honigman LLP

(57) ABSTRACT

The in-vehicle management device includes: a detection unit configured to detect the presence of a target device that is an in-vehicle device that does not support a predetermined message among in-vehicle devices included in an in-vehicle network; and a control unit configured to perform control for causing the target device detected by the detection unit to transition to a sleep state when a state where the predeter- (Continued)

mined message from the in-vehicle devices does not arrive at the in-vehicle management device has continued for a predetermined period.

6 Claims, 7 Drawing Sheets

(56) References Cited

U.S. PATENT DOCUMENTS

| | | | | |
|---|---|---|---|---|
| 2007/0128899 | A1* | 6/2007 | Mayer | G06F 9/4406 |
| | | | | 439/152 |
| 2009/0132118 | A1* | 5/2009 | Takeda | H04L 12/40013 |
| | | | | 701/1 |
| 2014/0180486 | A1* | 6/2014 | Newman, Jr. | G06F 1/266 |
| | | | | 700/295 |
| 2014/0180711 | A1* | 6/2014 | Kamen | G16H 70/40 |
| | | | | 705/2 |
| 2017/0033899 | A1* | 2/2017 | Rakib | H04L 27/2655 |
| 2017/0228953 | A1* | 8/2017 | Lupovici | G07C 9/00896 |
| 2017/0353309 | A1* | 12/2017 | Gray | G06F 21/51 |
| 2021/0203682 | A1* | 7/2021 | Bajpai | H04L 63/0435 |

FOREIGN PATENT DOCUMENTS

| | | |
|---|---|---|
| JP | 2009-296280 A | 12/2009 |
| JP | 2010-093676 A | 4/2010 |
| JP | 2011-087112 A | 4/2011 |

OTHER PUBLICATIONS

AUTOSAR, Specification of UDP Network Management, AUTOSAR CP Release 4.3.1. Dec. 8, 2017, pp. 19-44 in particular, p. 19, section 7.1.

International Search Report, Application No. PCT/JP2022/012218, mailed May 31, 2023. ISA/Japan Patent Office.

* cited by examiner

FIG. 4

| FUNCTION OF IN-VEHICLE DEVICE | SLEEP CONDITION | WAKE-UP CONDITION |
|---|---|---|
| VEHICLE SPEED MEASUREMENT FUNCTION | IGNITION OFF | IGNITION ON |
| AUTOMATIC DRIVING CONTROL FUNCTION | AUTOMATIC DRIVING MODE OFF | AUTOMATIC DRIVING MODE ON |
| ⋮ | ⋮ | ⋮ |

IN-VEHICLE MANAGEMENT DEVICE AND MANAGEMENT METHOD

CROSS-REFERENCE TO RELATED APPLICATIONS

This application is the U.S. national stage of PCT/JP2022/012218 filed on Mar. 17, 2022, which claims priority of Japanese Patent Application No. JP 2021-059948 filed on Mar. 31, 2021, the contents of which are incorporated herein.

TECHNICAL FIELD

The present disclosure relates to an in-vehicle management device and a management method.

BACKGROUND

JP 2019-161103A discloses a vehicle control device described below. The vehicle control device includes: a communication interface means that serves as an interface with a communication system to which a control device that controls behaviors of a control target installed in the vehicle is connected; and a communication setting means that is independent of the control device and adjusts communication settings regarding the control device that performs communication via the communication system.

AUTOSAR CP R19-11, "Specification of UDP Network Management", AUTOSAR, Nov. 28, 2019 discloses, in pages 21 to 23 thereof, a technology for causing an in-vehicle device to transition to a sleep state in accordance with AUTOSAR standards when the in-vehicle device need not perform communication. With this technology, it is possible to reduce power consumption by the in-vehicle device.

Technologies for adjusting communication settings in an in-vehicle network have been developed.

There is demand for a technology that can improve functions relating to sleep control more than the technologies disclosed in JP 2019-161103A and AUTOSAR CP R19-11, "Specification of UDP Network Management", AUTOSAR, Nov. 28, 2019.

The present disclosure was made to solve the above problem, and has an object of providing an in-vehicle management device and a management method that can further improve functions relating to sleep control.

Effects of the Present Disclosure

According to the present disclosure, functions relating to sleep control can be further improved.

SUMMARY

An in-vehicle management device according to the present disclosure includes: a detection unit configured to detect the presence of a target device that is an in-vehicle device that does not support a predetermined message among in-vehicle devices included in an in-vehicle network; and a control unit configured to perform control for causing the target device detected by the detection unit to transition to a sleep state when a state where the predetermined message from the in-vehicle devices does not arrive at the in-vehicle management device has continued for a predetermined period.

A management method according to the present disclosure is a management method performed by an in-vehicle management device, the method includes: a step of detecting the presence of a target device that is an in-vehicle device that does not support a predetermined message among in-vehicle devices included in an in-vehicle network; and a step of performing control for causing the detected target device to transition to a sleep state when a state where the predetermined message from the in-vehicle devices does not arrive at the in-vehicle management device has continued for a predetermined period.

An aspect of the present disclosure can be realized not only as the in-vehicle management device including the characteristic processing units described above but also as a semiconductor integrated circuit that realizes a part or the whole of the in-vehicle management device, a program for causing a computer to execute processing steps performed by the in-vehicle management device, an in-vehicle communication system including the in-vehicle management device, a semiconductor integrated circuit that realizes a part or the whole of the in-vehicle communication system, a relay method including steps of performing processing performed in the in-vehicle communication system, or a program for causing a computer to execute the steps of performing processing performed in the in-vehicle communication system.

BRIEF DESCRIPTION OF THE DRAWINGS

FIG. 4 is a diagram showing an example of a condition table that is stored in the storage unit of the relay device according to an embodiment of the present disclosure.

DETAILED DESCRIPTION OF PREFERRED EMBODIMENTS

Figure 1:
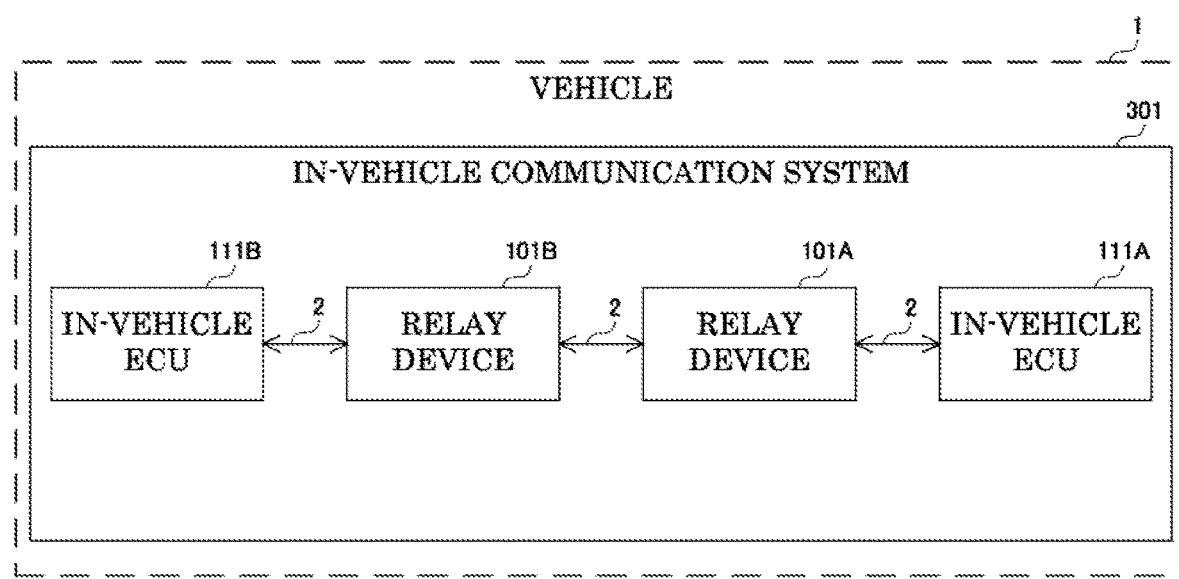
FIG. 1 is a diagram showing an example of the configuration of an in-vehicle communication system according to an embodiment of the present disclosure.

First, the details of an embodiment of the present disclosure are listed and described.

An in-vehicle management device according to an embodiment of the present disclosure includes: a detection unit configured to detect the presence of a target device that is an in-vehicle device that does not support a predetermined message among in-vehicle devices included in an in-vehicle network; and a control unit configured to perform control for causing the target device detected by the detection unit to transition to a sleep state when a state where the predetermined message from the in-vehicle devices does not arrive at the in-vehicle management device has continued for a predetermined period.

As described above, when the state where the predetermined message does not arrive has continued for the predetermined period, control is performed to cause the target device to transition to the sleep state, and accordingly, the target device can be caused to transition to the sleep state at a timing when the in-vehicle devices should transition to the sleep state in a system in which the in-vehicle devices are caused to transition to the sleep state with use of the predetermined message, for example. Thus, functions relating to sleep control can be further improved.

A configuration is possible in which, the in-vehicle management device further includes a determination unit configured to determine whether or not a sleep condition of the target device is satisfied, wherein, in a case where it is determined by the determination unit that the sleep condition is satisfied and the state where the predetermined message from the in-vehicle devices does not arrive at the in-vehicle management device has continued for the predetermined period, the control unit performs control for causing the target device to transition to the sleep state.

With this configuration, it is possible to cause the target device to transition to the sleep state at a timing when there is no need to continue communication between the target device and other in-vehicle devices and the other in-vehicle devices should transition to the sleep state.

A configuration is possible in which, the in-vehicle management device further includes: a determination unit configured to determine whether or not a sleep condition of the target device is satisfied; and a transmission unit configured to transmit the predetermined message instead of the target device to the in-vehicle devices included in the in-vehicle network in a case where it is determined by the determination unit that the sleep condition is not satisfied.

According to this configuration, when it is necessary to continue communication between the target device and other in-vehicle devices, it is possible to maintain the wake-up state of the other in-vehicle devices by transmitting the predetermined message to the other in-vehicle devices, and thus, it is possible to maintain the state where the target device can communicate with the other in-vehicle devices.

A configuration is possible in which, the in-vehicle management device further includes an authentication processing unit configured to perform authentication processing for authenticating the target device detected by the detection unit, wherein, in a case where the target device has been authenticated by the authentication processing unit, the transmission unit transmits the predetermined message instead of the target device to the in-vehicle devices.

With this configuration, it is possible to prevent a situation in which transition of the other in-vehicle devices to the sleep state is hindered by an unauthorized target device.

A configuration is possible in which, when a wake-up condition of the target device is satisfied or the in-vehicle management device has received the predetermined message from any of the in-vehicle devices, the control unit performs control for causing the target device to recover from the sleep state.

According to this configuration, when the target device needs to communicate with other in-vehicle devices or the other in-vehicle devices need to communicate with the target device, it is possible to cause the target device to recover from the sleep state to a state where the target device can communicate with the other in-vehicle devices.

A management method according to an embodiment of the present disclosure is a management method that is performed by an in-vehicle management device the method includes: a step of detecting the presence of a target device that is an in-vehicle device that does not support a predetermined message among in-vehicle devices included in an in-vehicle network; and a step of performing control for causing the detected target device to transition to a sleep state when a state where the predetermined message from the in-vehicle devices does not arrive at the in-vehicle management device has continued for a predetermined period.

As described above, when the state where the predetermined message does not arrive has continued for the predetermined period, control is performed to cause the target device to transition to the sleep state, and accordingly, the target device can be caused to transition to the sleep state at a timing when the in-vehicle devices should transition to the sleep state in a system in which the in-vehicle devices are caused to transition to the sleep state with use of the predetermined message, for example. Thus, functions relating to sleep control can be further improved.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a diagram showing an example of the configuration of an in-vehicle communication system according to an embodiment of the present disclosure. As shown in FIG. 1, an in-vehicle communication system 301 includes relay devices 101 and in-vehicle ECUs (Electronic Control Units) 111. For example, the in-vehicle communication system 301 includes relay devices 101A and 101B as the relay devices 101 and in-vehicle ECUs 111A and 111B as the in-vehicle ECUs 111. The in-vehicle communication system 301 is installed in a vehicle 1.

The relay devices 101A and 101B and the in-vehicle ECUs 111A and 111B are devices that comply with a predetermined in-vehicle network management method. More specifically, the relay devices 101A and 101B and the in-vehicle ECUs 111A and 111B comply with the AUTOSAR (AUTomotive Open System ARchitecture), which is an example of the in-vehicle network management method.

The in-vehicle ECU 111A and the relay device 101A are connected to each other via a cable 2. The in-vehicle ECU 111B and the relay device 101B are connected to each other via a cable 2. The relay device 101A and the relay device 101B are connected to each other via a cable 2. The cables 2 are Ethernet (registered trademark) cables, for example. The relay devices 101, the in-vehicle ECUs 111, and the cables 2 constitute an in-vehicle network.

There is no limitation to the configuration in which the in-vehicle communication system 301 includes two in-vehicle ECUs 111, and the in-vehicle communication system 301 may include three or more in-vehicle ECUs 111. For example, the in-vehicle communication system 301 may include two or more in-vehicle ECUs 111 that are connected to the relay device 101A via cables 2, or include two or more in-vehicle ECUs 111 that are connected to the relay device 101B via cables 2. Alternatively, a configuration is also possible in which the in-vehicle communication system 301 does not include the relay device 101B or includes three or more relay devices 101. The relay device 101A is an example of an in-vehicle management device. The relay device 101B and the in-vehicle ECUs 111 are examples of in-vehicle devices.

Also, the in-vehicle communication system 301 may include a consumer product that is temporarily installed as an in-vehicle device in the vehicle 1. The consumer product is, for example, a terminal device such as a smartphone or a USB (Universal Serial Bus) memory.

Examples of the in-vehicle ECUs 111 include an electric power steering (EPS), a brake control device, an accelerator control device, a steering control device, and a driving support device that gives instructions and the like to various devices included in an advanced driver-assistance system (ADAS).

The relay devices 101 can communicate with the in-vehicle ECUs 111. The relay devices 101 perform relay processing for relaying information between a plurality of in-vehicle ECUs 111 connected to different cables 2, for example. For example, the relay device 101A is a switching device, and the relay device 101B is a gateway device.

Each in-vehicle ECU 111 periodically transmits an LLDP frame conforming to the LLDP (Link Layer Discovery Protocol) to the relay device 101 connected to the in-vehicle ECU 111, for example. A MAC address and an IP address of the in-vehicle ECU 111 transmitting the LLDP frame are included in the LLDP frame.

Each relay device 101 receives the LLDP frame from the in-vehicle ECU 111 connected to the relay device 101, and obtains various types of information such as the MAC address and the IP address of the in-vehicle ECU 111, which has transmitted the LLDP frame, from the received LLDP frame.

The relay devices 101 and the in-vehicle ECUs 111 transition from a wake-up state to a sleep state and from the sleep state to the wake-up state. In the wake-up state, the relay devices 101 and the in-vehicle ECUs 111 communicate with other devices included in the in-vehicle communication system 301. In the sleep state, the relay devices 101 and the in-vehicle ECUs 111 stop communicating with the other devices included in the in-vehicle communication system 301. Here, the sleep state is a state in which power consumption is lower than that in the wake-up state due to suspension of some functions of the devices, suspension of power supply to the devices, or a reduction in the clock frequency in the devices, for example. The sleep state is also called a standby power supply mode state, a waiting state, a power saving state, a standby state, or the like. The wake-up state is also called a normal activated state, a normal operation state, a non-sleep state, or the like.

For example, a sleep condition for transitioning to the sleep state, a timeout period for waiting to transition to the sleep state after the sleep condition is satisfied, and a wake-up condition for transitioning to the wake-up state are set in advance for each of the relay devices 101 and the in-vehicle ECUs 111.

Examples of the sleep condition include a condition that the vehicle 1 enters an ignition OFF state and a condition that the vehicle 1 stops. The vehicle 1 entering the ignition OFF state means that the ignition power source of the vehicle 1 is turned OFF. Also, examples of the wake-up condition include a condition that the vehicle 1 enters an ignition ON state and a condition that the vehicle 1 starts traveling. For example, different sleep conditions, different wake-up conditions, and the same timeout period are set for the relay devices 101 and the in-vehicle ECUs 111.

In the wake-up state, each of the relay devices 101 and the in-vehicle ECUs 111 periodically transmits an NM (Network Management) message conforming to the AUTOSAR to each device included in the in-vehicle communication system 301, for example. Specifically, each of the relay devices 101 and the in-vehicle ECUs 111 broadcasts an Ethernet frame including the NM message to each device included in the in-vehicle communication system 301. Thus, the relay devices 101 and the in-vehicle ECUs 111 can notify other devices included in the in-vehicle communication system 301 that the relay devices 101 and the in-vehicle ECUs 111 are in the wake-up state. That is, the NM message is a message used by the devices included in the in-vehicle communication system 301 to transition to the sleep state and the wake-up state while cooperating with each other in accordance with the AUTOSAR standards.

When the sleep condition of a relay device 101 or an in-vehicle ECU 111 is satisfied in the wake-up state, the relay device 101 or the in-vehicle ECU 111 stops transmitting the NM message.

Then, the relay device 101 or the in-vehicle ECU 111 transitions to the sleep state if no NM message is received from other devices during a period from when the sleep condition is satisfied in the wake-up state to when the timeout period has elapsed.

More specifically, when the sleep condition of a relay device 101 or an in-vehicle ECU 111 is satisfied in the wake-up state, the relay device 101 or the in-vehicle ECU 111 starts a timer. When the NM message is received from any other device before a period of time measured by the timer reaches the timeout period of the relay device 101 or the in-vehicle ECU 111, the relay device 101 or the in-vehicle ECU 111 resets the timer. On the other hand, when the period of time measured by the timer has reached the timeout period of the relay device 101 or the in-vehicle ECU 111 without the relay device 101 or the in-vehicle ECU 111 receiving the NM message from any other device after starting or resetting the timer, the relay device 101 or the in-vehicle ECU 111 transitions to the sleep state. Thus, it is possible to cause each device included in the in-vehicle communication system 301 to transition to the sleep state, with use of the NM message, when the sleep condition of the device is satisfied.

When the wake-up condition of the relay device 101 or the in-vehicle ECU 111 is satisfied in the sleep state, the relay device 101 or the in-vehicle ECU 111 transitions to the wake-up state and starts transmitting the NM message periodically. Also, when the NM message is received from any other device included in the in-vehicle communication system 301 in the sleep state, the relay device 101 or the in-vehicle ECU 111 transitions to the wake-up state. Thus, it is possible to cause each device to transition to the wake-up state, with use of the NM message, when the wake-up condition of any device included in the in-vehicle communication system 301 is satisfied.

When there is no need to perform communication between the devices, for example, it is possible to cause each device included in the in-vehicle communication system 301 to transition to the sleep state with use of the NM message, and therefore, it is possible to reduce power consumption by each device.

The in-vehicle communication system 301 may include an in-vehicle device that does not comply with the AUTOSAR.

Figure 2:
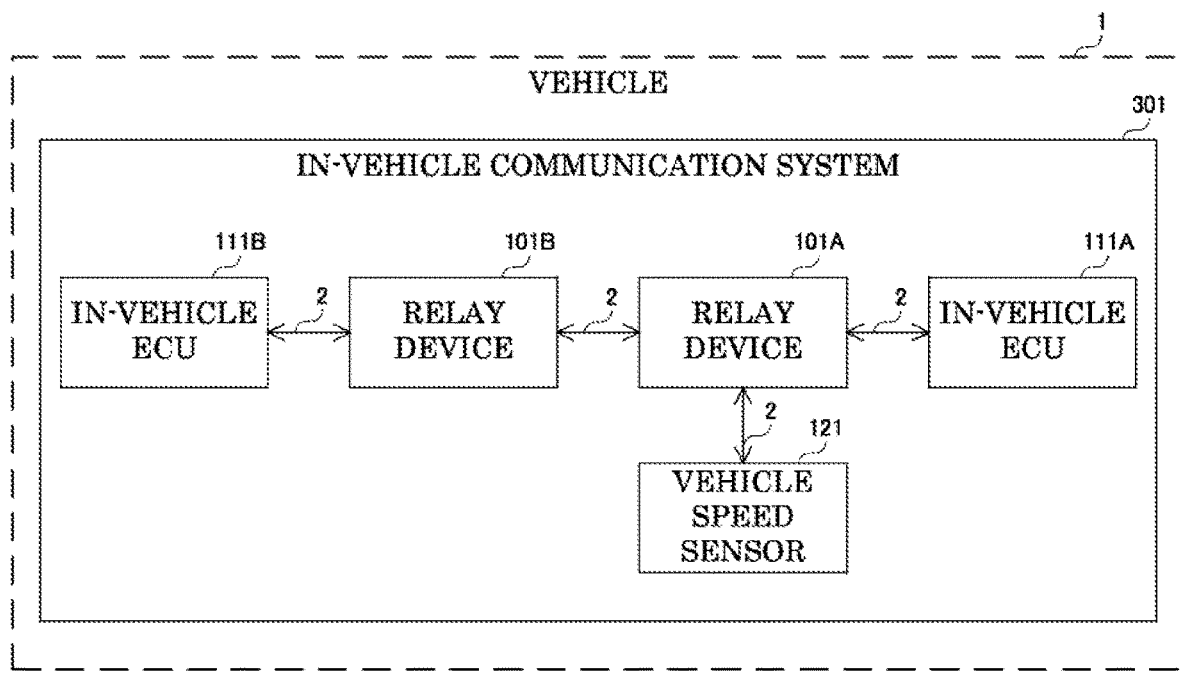
FIG. 2 is a diagram showing another example of the configuration of the in-vehicle communication system according to an embodiment of the present disclosure.

FIG. 2 is a diagram showing another example of the configuration of the in-vehicle communication system according to an embodiment of the present disclosure. FIG. 2 shows a state where a vehicle speed sensor 121 is post-installed in the in-vehicle communication system 301 shown in FIG. 1. The vehicle speed sensor 121 is an example of an in-vehicle device, for example. The vehicle speed sensor 121 is an in-vehicle device added to the in-vehicle communication system 301.

As shown in FIG. 2, the vehicle speed sensor 121 is connected to the relay device 101A by a user of the vehicle 1, for example. The vehicle speed sensor 121 is an in-vehicle device that does not comply with the AUTOSAR and does not support the NM message. That is, the NM message cannot be processed by the vehicle speed sensor 121. The vehicle speed sensor 121 does not have functions relating to the NM message, cannot process a received NM message, and cannot transmit an NM message. The vehicle speed sensor 121 measures the speed of the vehicle 1 periodically, for example, and transmits an Ethernet frame including measurement information indicating a measurement result via the relay device 101A to the in-vehicle ECU 111A.

In the in-vehicle communication system 301, it is not possible to cause the vehicle speed sensor 121 to transition to the sleep state with use of the NM message, and accordingly, it is not possible to reduce power consumption by the vehicle speed sensor 121. That is, the vehicle speed sensor 121 cannot cooperate with other devices in accordance with the AUTOSAR standards in the in-vehicle communication system 301, with respect to transition to the sleep state and transition to the wake-up state.

Therefore, the in-vehicle communication system 301 and the relay device 101A according to the present disclosure solve this problem with the configuration and operations described below and reduce power consumption by the device that cannot cooperate with other devices with respect to transition to the sleep state and transition to the wake-up state.

Figure 3:
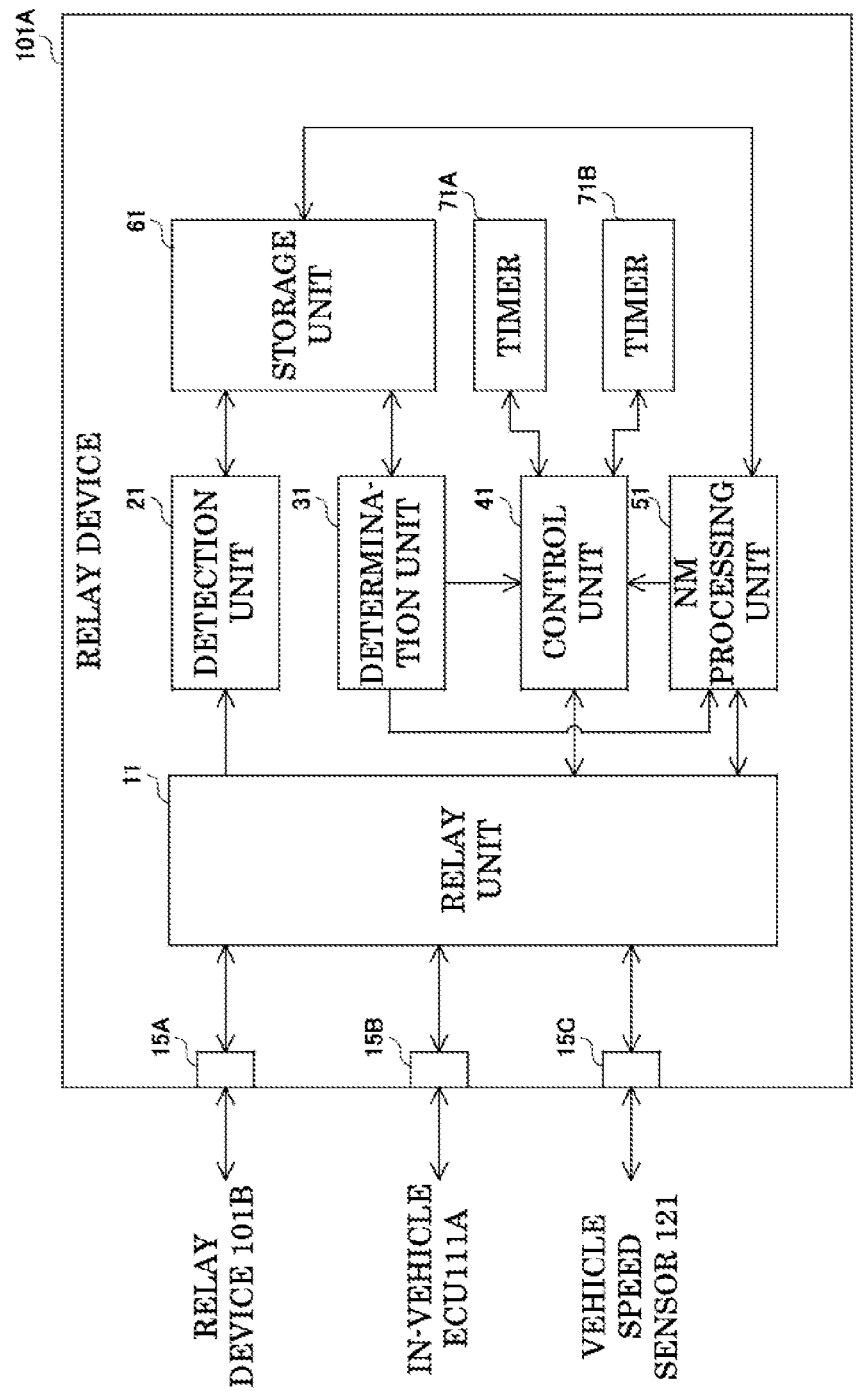
FIG. 3 is a diagram showing the configuration of a relay device according to an embodiment of the present disclosure.

FIG. 3 is a diagram showing the configuration of a relay device according to an embodiment of the present disclosure. As shown in FIG. 3, the relay device 101A includes communication ports 15A, 15B, and 15C, a relay unit 11, a detection unit 21, a determination unit 31, a control unit 41, an NM processing unit 51, a storage unit 61, and timers 71A and 71B. Hereinafter, each of the communication ports 15A, 15B, and 15C will also be referred to as a "communication port 15". The NM processing unit 51 is an example of a transmission unit.

The communication ports 15 are terminals to which the cables 2 can be connected, for example. Note that the communication ports 15 may also be terminals of an integrated circuit. The communication port 15A is connected to the relay device 101B via the cable 2. The communication port 15B is connected to the in-vehicle ECU 111A via the cable 2. The communication port 15C is connected to the vehicle speed sensor 121 via the cable 2. Note that the relay device 101A may also include four or more communication ports 15.

The timeout period is stored in the storage unit 61. Also, the sleep condition of the relay device 101A and the wake-up condition of the relay device 101A are stored in the storage unit 61.

The relay unit 11, the detection unit 21, the determination unit 31, the control unit 41, and the NM processing unit 51 are realized by processors such as a CPU (Central Processing Unit) and a DSP (Digital Signal Processor), for example. The storage unit 61 is a non-volatile memory, for example.

The relay unit 11 receives Ethernet frames transmitted from in-vehicle devices such as the in-vehicle ECUs 111 and the vehicle speed sensor 121, via the communication ports 15, and performs relay processing on the received Ethernet frames. For example, the relay unit 11 can function as an L2 switch and performs relay processing on an Ethernet frame transmitted between the in-vehicle ECU 111A and the vehicle speed sensor 121, which are connected to the relay device 101A. Also, the relay unit 11 can function as an L3 switch, for example, and performs relay processing on an Ethernet frame transmitted between in-vehicle devices that are connected to different relay devices 101.

The detection unit 21 detects the presence of a target device that is an in-vehicle device that does not support the NM message among the in-vehicle devices included in the in-vehicle network. More specifically, the detection unit 21 detects the presence of the vehicle speed sensor 121, which is an in-vehicle device that does not comply with the AUTOSAR, as the target device. The NM message is an example of a predetermined message.

When the vehicle speed sensor 121 is connected to the communication port 15C of the relay device 101A via the cable 2, the vehicle speed sensor 121 generates an authentication frame that is an Ethernet frame including noncompliance information indicating that the vehicle speed sensor 121 does not comply with the AUTOSAR and authentication information such as the ID and the MAC address of the vehicle speed sensor 121, and transmits the generated authentication frame to the relay device 101A.

The relay unit 11 receives the authentication frame from the vehicle speed sensor 121 via the communication port 15C, and outputs the received authentication frame to the detection unit 21.

The detection unit 21 receives the authentication frame from the relay unit 11, and obtains the authentication information and the noncompliance information from the authentication frame. The detection unit 21 determines that the vehicle speed sensor 121 that has transmitted the authentication frame does not support the NM message because the authentication frame includes the noncompliance information. Then, the detection unit 21 performs authentication processing for authenticating the vehicle speed sensor 121 with use of the obtained authentication information. That is, the detection unit 21 functions as an authentication processing unit. When the authentication processing is successful, the detection unit 21 obtains the MAC address of the vehicle speed sensor 121 from the authentication frame, and saves the obtained MAC address as the MAC address of the target device in the storage unit 61.

After saving the MAC address of the vehicle speed sensor 121 as the MAC address of the target device in the storage unit 61, the detection unit 21 obtains the sleep condition and the wake-up condition of the vehicle speed sensor 121.

More specifically, the vehicle speed sensor 121 generates an LLDP frame that includes condition information indicating the sleep condition and the wake-up condition of the vehicle speed sensor 121, for example, and transmits the generated LLDP frame to the relay device 101A.

The detection unit 21 receives the LLDP frame from the vehicle speed sensor 121 via the communication port 15C and the relay unit 11, and obtains the condition information from the received LLDP frame. The detection unit 21 saves the sleep condition and the wake-up condition indicated by the obtained condition information as the sleep condition and the wake-up condition of the target device in the storage unit 61.

Alternatively, the vehicle speed sensor 121 generates an LLDP frame that includes function information indicating functions of the vehicle speed sensor 121. More specifically, the vehicle speed sensor 121 generates an LLDP frame including function information indicating that the vehicle speed sensor 121 has a vehicle speed measurement function.

The vehicle speed sensor 121 transmits the generated LLDP frame to the relay device 101A.

The detection unit 21 receives the LLDP frame from the vehicle speed sensor 121 via the communication port 15C and the relay unit 11, and obtains the function information from the received LLDP frame.

FIG. 4 is a diagram showing an example of a condition table that is stored in the storage unit of the relay device according to an embodiment of the present disclosure. As shown in FIG. 4, a condition table that shows correspondence between functions of in-vehicle devices and sleep conditions and wake-up conditions is stored in the storage unit 61.

The detection unit 21 obtains a sleep condition and a wake-up condition that correspond to the function indicated by the function information obtained from the LLDP frame, i.e., the vehicle speed measurement function, from the condition table stored in the storage unit 61. The detection unit 21 saves the obtained sleep condition and wake-up condition as the sleep condition and the wake-up condition of the target device in the storage unit 61.

The determination unit 31 determines whether or not the sleep condition of the relay device 101A is satisfied and whether or not the wake-up condition of the relay device 101A is satisfied.

More specifically, the determination unit 31 monitors the state of the vehicle 1 and performs determination processing of determining whether or not the sleep condition of the relay device 101A saved in the storage unit 61 is satisfied and determining whether or not the wake-up condition of the relay device 101A saved in the storage unit 61 is satisfied based on the monitoring result. The determination unit 31 performs the determination processing periodically, for example, and notifies the control unit 41 and the NM processing unit 51 of the determination result.

Also, the determination unit 31 determines whether or not the sleep condition of the vehicle speed sensor 121, which is the target device, is satisfied and whether or not the wake-up condition of the vehicle speed sensor 121 is satisfied.

More specifically, the determination unit 31 performs determination processing of determining whether or not the sleep condition of the target device saved in the storage unit 61 is satisfied and determining whether or not the wake-up condition of the target device saved in the storage unit 61 is satisfied based on the monitoring result regarding the state of the vehicle 1. The determination unit 31 performs the determination processing periodically, for example, and notifies the control unit 41 and the NM processing unit 51 of the determination result.

When an Ethernet frame including the NM message is received from an in-vehicle device included in the in-vehicle communication system 301 via a communication port 15, the relay unit 11 outputs the received Ethernet frame to the NM processing unit 51.

The NM processing unit 51 receives the Ethernet frame from the relay unit 11, obtains the NM message from the received Ethernet frame, and outputs an NM reception notification indicating reception of the NM message from the in-vehicle device included in the in-vehicle communication system 301 to the control unit 41.

Also, the NM processing unit 51 broadcasts the NM message to each device included in the in-vehicle communication system 301 while the relay device 101A is in the wake-up state. Specifically, the NM processing unit 51 generates an Ethernet frame that includes the NM message and a broadcast address as a destination IP address, and transmits the generated Ethernet frame via the relay unit 11 and the communication ports 15 to each device included in the in-vehicle communication system 301.

More specifically, when a notification indicating that the wake-up condition of the relay device 101A is satisfied is received from the determination unit 31, the NM processing unit 51 starts or continues broadcasting the NM message periodically. Also, when a notification indicating that the sleep condition of the relay device 101A is satisfied is received from the determination unit 31, the NM processing unit 51 stops broadcasting the NM message until a notification indicating that the wake-up condition of the relay device 101A is satisfied is received from the determination unit 31.

In a case where it is determined by the determination unit 31 that the sleep condition of the vehicle speed sensor 121, which is the target device, is not satisfied, for example, the NM processing unit 51 transmits the NM message instead of the vehicle speed sensor 121 to the in-vehicle devices included in the in-vehicle network.

More specifically, when a notification indicating that the wake-up condition of the vehicle speed sensor 121 is satisfied is received from the determination unit 31, the NM processing unit 51 starts or continues broadcasting the NM message periodically instead of the vehicle speed sensor 121. Also, when a notification indicating that the sleep condition of the vehicle speed sensor 121 is satisfied is received from the determination unit 31, the NM processing unit 51 stops broadcasting the NM message instead of the vehicle speed sensor 121 until a notification indicating that the wake-up condition of the vehicle speed sensor 121 is satisfied is received from the determination unit 31.

The NM processing unit 51 transmits the NM message instead of the vehicle speed sensor 121 in a case where the vehicle speed sensor 121 has been authenticated, for example. On the other hand, in a case where the vehicle speed sensor 121 has not been authenticated, the NM processing unit 51 does not transmit the NM message instead of the vehicle speed sensor 121 irrespective of whether or not a notification indicating that the wake-up condition of the vehicle speed sensor 121 is satisfied is received from the determination unit 31.

More specifically, the NM processing unit 51 confirms that the MAC address of the vehicle speed sensor 121 has been saved as the MAC address of the target device in the storage unit 61, and then broadcasts the NM message instead of the vehicle speed sensor 121. On the other hand, if the MAC address of the vehicle speed sensor 121 has not been saved as the MAC address of the target device in the storage unit 61, the NM processing unit 51 does not broadcast the NM message instead of the vehicle speed sensor 121.

The control unit 41 performs processing for causing the relay device 101A to transition to the sleep state and processing for causing the relay device 101A to transition to the wake-up state. Also, the control unit 41 performs control for causing the vehicle speed sensor 121, which is the target device, to transition to the sleep state and control for causing the vehicle speed sensor 121 to transition to the wake-up state.

When a notification indicating that the sleep condition of the relay device 101A is satisfied is received from the determination unit 31 while the relay device 101A is in the wake-up state, the control unit 41 starts the timer 71A.

When the NM reception notification is received from the NM processing unit 51 before a period of time measured by the timer 71A reaches the timeout period stored in the storage unit 61, the control unit 41 resets the timer 71A. On the other hand, when the period of time measured by the timer 71A has reached the timeout period without the control unit 41 receiving the NM reception notification from the NM processing unit 51 after starting or resetting the timer 71A, the control unit 41 performs processing for causing the relay device 101A to transition to the sleep state.

When a notification indicating that the wake-up condition of the relay device 101A is satisfied is received from the determination unit 31 or the NM reception notification is received from the NM processing unit 51 while the relay device 101A is in the sleep state, the control unit 41 performs processing for causing the relay device 101A to transition to the wake-up state.

In a case where it is determined by the determination unit 31 that the sleep condition of the vehicle speed sensor 121, which is the target device, is satisfied, the control unit 41 performs control for causing the vehicle speed sensor 121 to transition to the sleep state.

More specifically, when a notification indicating that the sleep condition of the vehicle speed sensor 121 is satisfied is received from the determination unit 31, the control unit 41 transmits a sleep transition instruction for causing the vehicle speed sensor 121 to transition to the sleep state, as a message that can be processed by the vehicle speed sensor 121, via the relay unit 11 to the vehicle speed sensor 121. Specifically, when a notification indicating that the sleep condition of the vehicle speed sensor 121 is satisfied is received from the determination unit 31, the control unit 41 generates an Ethernet frame including the sleep transition instruction and addressed to the vehicle speed sensor 121, and outputs the generated Ethernet frame to the relay unit 11.

The relay unit 11 receives the Ethernet frame from the control unit 41, and transmits the received Ethernet frame via the communication port 15C to the vehicle speed sensor 121.

The vehicle speed sensor 121 receives the Ethernet frame from the relay device 101A and transitions to the sleep state following the sleep transition instruction included in the received Ethernet frame.

When a state where the NM message does not arrive at the relay device 101A has continued for a predetermined period, the control unit 41 performs control for causing the vehicle speed sensor 121, which is the target device, to transition to the sleep state. That is, the control unit 41 performs control for causing the vehicle speed sensor 121 to transition to the sleep state when arrival of the NM message to the relay device 101A has ceased. More specifically, when a state where the control unit 41 does not receive the NM reception notification from the NM processing unit 51 has continued for the predetermined period, the control unit 41 generates an Ethernet frame including the sleep transition instruction and transmits the generated Ethernet frame via the relay unit 11 and the communication port 15C to the vehicle speed sensor 121.

The control unit 41 performs control for causing the vehicle speed sensor 121, which is the target device, to transition to the sleep state in a case where it is determined by the determination unit 31 that the sleep condition of the vehicle speed sensor 121 is satisfied and the state where the NM message does not arrive at the relay device 101A has continued for the predetermined period, for example.

More specifically, when a notification indicating that the sleep condition of the vehicle speed sensor 121 is satisfied is received from the determination unit 31, the control unit 41 starts the timer 71B.

When the NM reception notification is received from the NM processing unit 51 before the period of time measured by the timer 71B reaches the timeout period stored in the storage unit 61, the control unit 41 resets the timer 71B. On the other hand, when the period of time measured by the timer 71B has reached the timeout period without the control unit 41 receiving the NM reception notification from the NM processing unit 51 after starting or resetting the timer 71B, the control unit 41 generates an Ethernet frame including the sleep transition instruction and transmits the generated Ethernet frame via the relay unit 11 and the communication port 15C to the vehicle speed sensor 121.

The vehicle speed sensor 121 receives the Ethernet frame from the relay device 101A and transitions to the sleep state following the sleep transition instruction included in the received Ethernet frame.

When the wake-up condition of the vehicle speed sensor 121 is satisfied or the relay device 101A has received the NM message, the control unit 41 performs control for causing the vehicle speed sensor 121 to recover from the sleep state.

More specifically, when a notification indicating that the wake-up condition of the vehicle speed sensor 121 is satisfied is received from the determination unit 31 or the NM reception notification is received from the NM processing unit 51 while the vehicle speed sensor 121 is in the sleep state, the control unit 41 performs control for causing the vehicle speed sensor 121 to transition to the wake-up state. More specifically, the control unit 41 transmits a wake-up transition instruction for causing the vehicle speed sensor 121 to transition to the wake-up state, as a message that can be processed by the vehicle speed sensor 121, via the relay unit 11 to the vehicle speed sensor 121. Specifically, the control unit 41 generates an Ethernet frame addressed to the vehicle speed sensor 121 and including the wake-up transition instruction, and transmits the generated Ethernet frame via the relay unit 11 and the communication port 15C to the vehicle speed sensor 121.

The vehicle speed sensor 121 receives the Ethernet frame from the relay device 101A and transitions to the wake-up state following the wake-up transition instruction included in the received Ethernet frame.

The devices in the vehicle-mounted communication system according to an embodiment of the present disclosure each have a computer that includes a memory, and in each of such devices, an arithmetic processing unit such as a CPU in the computer reads out, from the memory, a program that includes part or all of the steps of the sequence described below, and executes the program. The programs executed by the devices can be installed from an external source. The programs executed by the devices are distributed in a state of being stored in recording media or distributed via a communication line.

Figure 5:
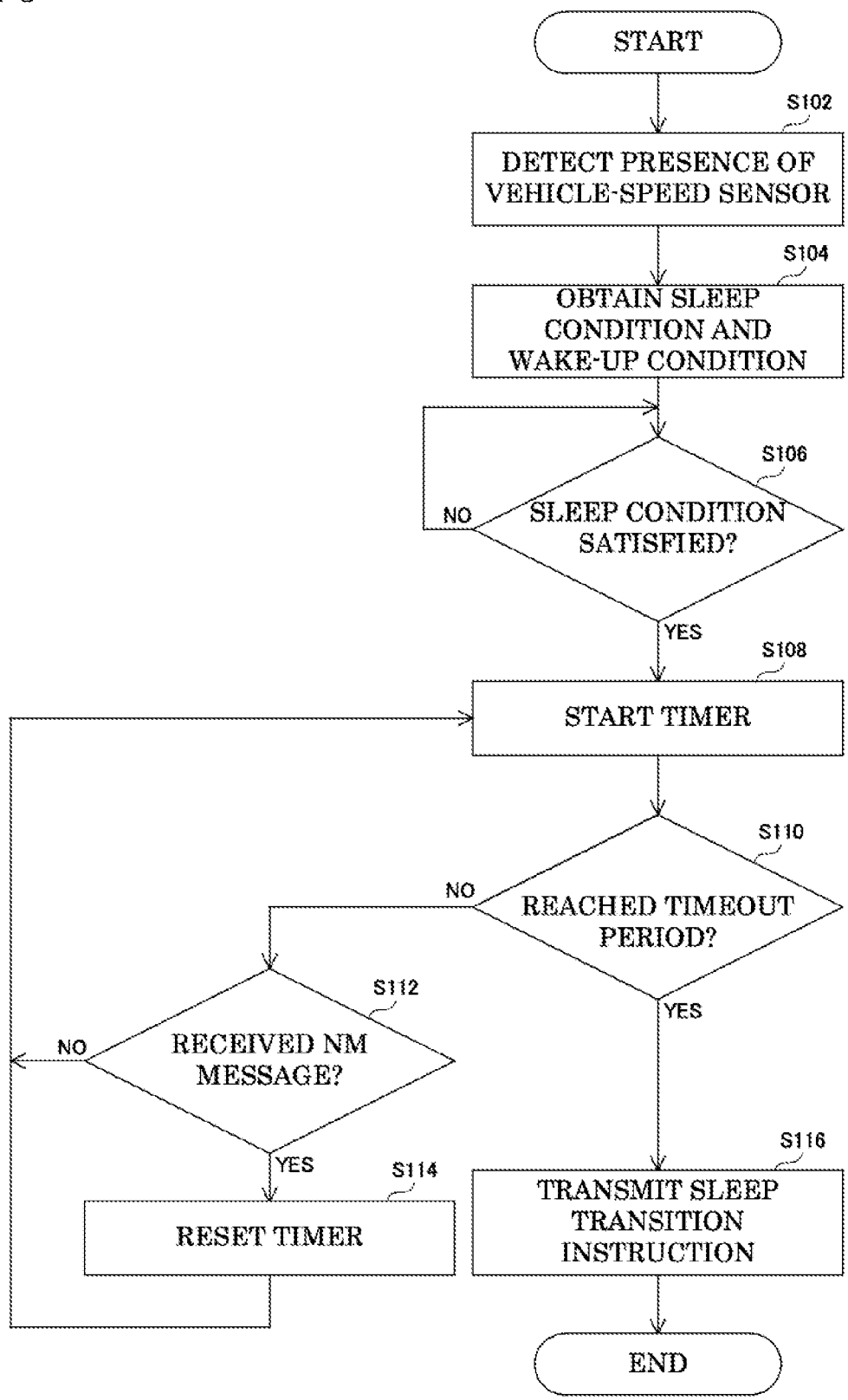
FIG. 5 is a flowchart showing an example of an operation procedure followed by the relay device according to an embodiment of the present disclosure when causing the vehicle speed sensor to transition to the sleep state.

FIG. 5 is a flowchart showing an example of an operation procedure followed by the relay device according to an embodiment of the present disclosure when causing the vehicle speed sensor to transition to the sleep state.

As shown in FIG. 5, first, the relay device 101A detects the presence of the vehicle speed sensor 121 as the target device included in the in-vehicle network (step S102).

Next, the relay device 101A obtains the sleep condition and the wake-up condition of the vehicle speed sensor 121 (step S104).

Next, the relay device 101A waits for the sleep condition of the vehicle speed sensor 121 to be satisfied (NO in step S106), and when it is determined that the sleep condition of the vehicle speed sensor 121 is satisfied (YES in step S106), the relay device 101A starts the timer 71B (step S108).

Next, the relay device 101A waits for the period of time measured by the timer 71B to reach the timeout period and waits for the NM message from in-vehicle devices included in the in-vehicle communication system 301 (NO in step S110 and NO in step S112), and when the NM message is received from any of the in-vehicle devices before the period of time measured by the timer 71B reaches the timeout period (NO in step S110 and YES in step S112), the relay device 101A resets the timer 71B (step S114).

On the other hand, when a state where the NM message does not arrive at the relay device 101A has continued for the predetermined period, the relay device 101A performs control for causing the vehicle speed sensor 121 to transition to the sleep state. More specifically, when the period of time measured by the timer 71B has reached the timeout period (YES in step S110) without the relay device 101A receiving the NM message from any in-vehicle device after starting or resetting the timer 71B, the relay device 101A transmits the sleep transition instruction to the vehicle speed sensor 121 (step S116).

Figure 6:
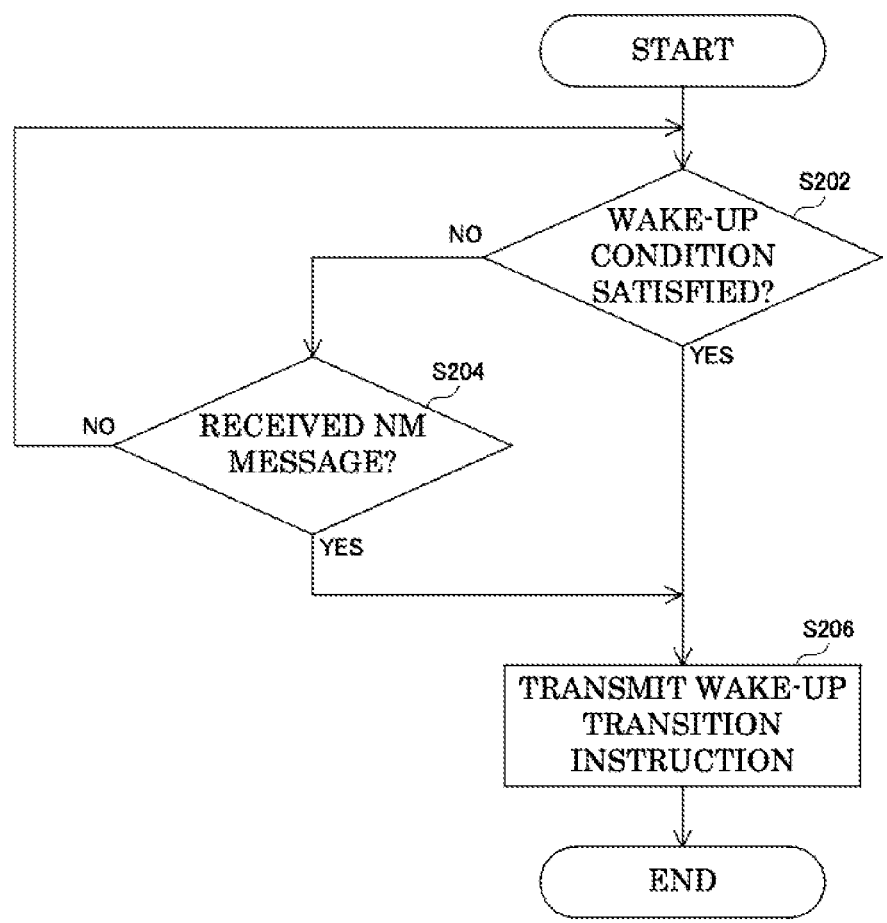
FIG. 6 is a flowchart showing an example of an operation procedure followed by the relay device according to an embodiment of the present disclosure when causing the vehicle speed sensor to transition to the wake-up state.

FIG. 6 is a flowchart showing an example of an operation procedure followed by the relay device according to an embodiment of the present disclosure when causing the vehicle speed sensor to transition to the wake-up state. As shown in FIG. 6, first, the relay device 101A waits for the wake-up condition of the vehicle speed sensor 121 to be satisfied and waits for the NM message from any of the in-vehicle devices included in the in-vehicle communication system 301 (NO in step S202 and NO in step S204) while the vehicle speed sensor 121 is in the sleep state.

Next, when it is determined that the wake-up condition of the vehicle speed sensor 121 is satisfied (YES in step S202), for example, the relay device 101A transmits the wake-up transition instruction to the vehicle speed sensor 121 (step S206).

Alternatively, when the NM message is received from any of the in-vehicle devices included in the in-vehicle communication system 301 (YES in step S204), the relay device 101A transmits the wake-up transition instruction to the vehicle speed sensor 121 (step S206).

Figure 7:
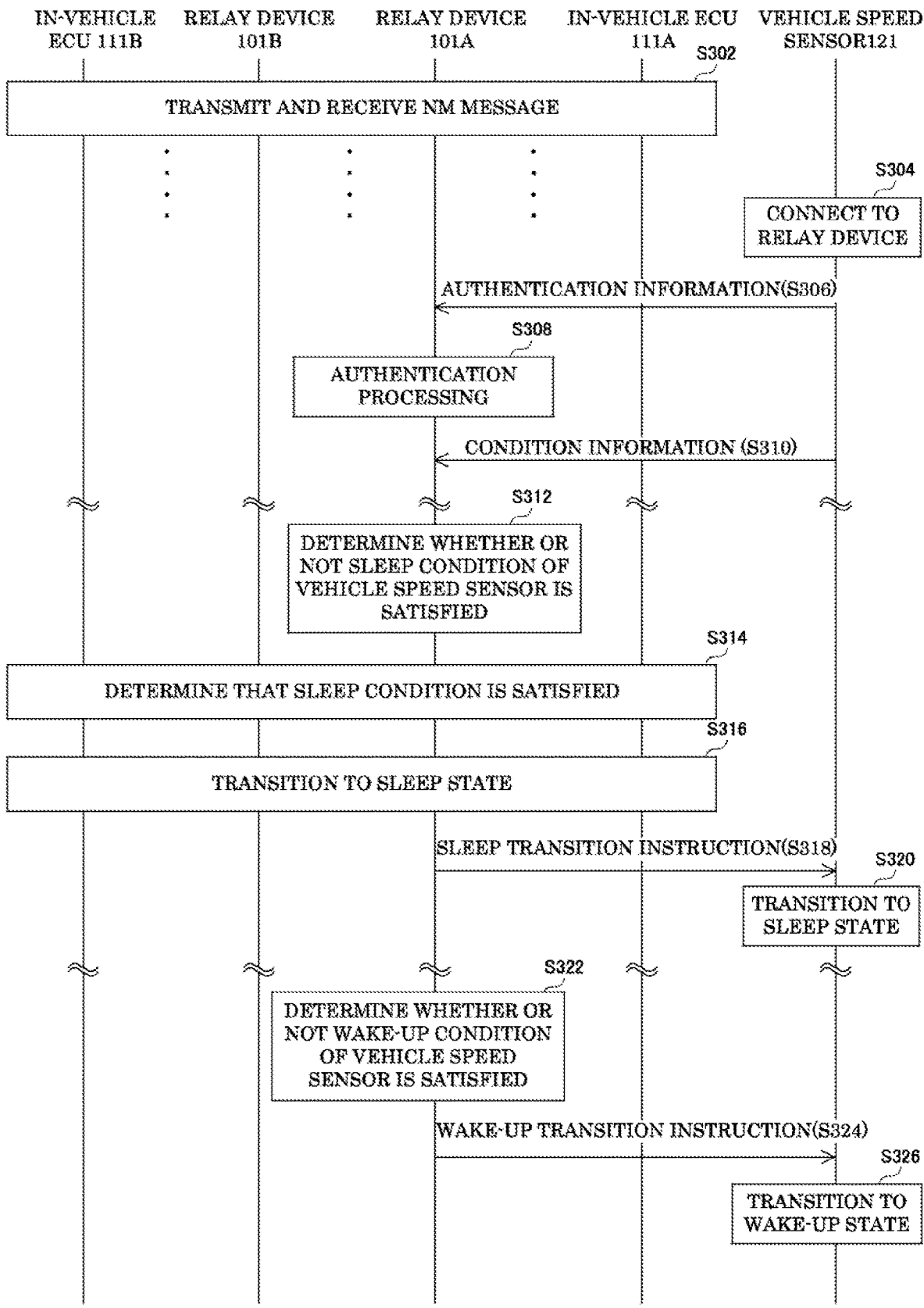
FIG. 7 is a diagram showing an example of a sequence of transition to the sleep state and transition to the wake-up state in the in-vehicle communication system according to an embodiment of the present disclosure.

FIG. 7 is a diagram showing an example of a sequence of transition to the sleep state and transition to the wake-up state in the in-vehicle communication system according to an embodiment of the present disclosure.

As shown in FIG. 7, first, the in-vehicle ECUs 111 and the relay devices 101, for example, periodically transmit and receive the NM message (step S302).

Next, the vehicle speed sensor 121 is added to the in-vehicle communication system 301. Specifically, the vehicle speed sensor 121 is connected to the relay device 101A by the user of the vehicle 1, for example (step S304).

Next, the vehicle speed sensor 121 transmits authentication information included in an authentication frame to the relay device 101A (step S306).

Next, the relay device 101A obtains the authentication information from the authentication frame received from the vehicle speed sensor 121, performs authentication processing for authenticating the vehicle speed sensor 121 with use of the obtained authentication information, and when the authentication processing is successful, the relay device 101A saves the MAC address of the vehicle speed sensor 121 as the MAC address of the target device in the storage unit 61 (step S308).

Next, the vehicle speed sensor 121 transmits condition information indicating the sleep condition and the wake-up condition and included in an LLDP frame to the relay device 101A (step S310).

Next, the relay device 101A determines that the sleep condition of the vehicle speed sensor 121 is satisfied (step S312).

Next, any of the in-vehicle ECUs 111 and the relay devices 101 determines that the sleep condition of the in-vehicle ECU 111 or the relay device 101 is satisfied (step S314).

Next, the in-vehicle ECU 111 or the relay device 101 transitions to the sleep state when the timer included in the in-vehicle ECU 111 or the relay device 101 has reached the timeout period (step S316).

Next, the relay device 101A transmits the sleep transition instruction included in an Ethernet frame to the vehicle speed sensor 121 (step S318).

Next, the vehicle speed sensor 121 transitions to the sleep state following the sleep transition instruction included in the Ethernet frame received from the relay device 101A (step S320).

Next, the relay device 101A determines that the wake-up condition of the vehicle speed sensor 121 is satisfied (step S322).

Next, the relay device 101A transmits the wake-up transition instruction included in an Ethernet frame to the vehicle speed sensor 121 (step S324).

Next, the vehicle speed sensor 121 transitions to the wake-up state following the wake-up transition instruction included in the Ethernet frame received from the relay device 101A (step S326).

In the in-vehicle communication system 301 according to the embodiment of the present disclosure, the NM processing unit 51 transmits the NM message instead of the vehicle speed sensor 121 to the in-vehicle devices included in the in-vehicle network in the case where it is determined that the sleep condition of the vehicle speed sensor 121 is not satisfied, but there is no limitation to this configuration. A configuration is also possible in which the NM processing unit 51 periodically broadcasts the NM message until a notification indicating that the sleep condition of the relay device 101A is satisfied is received from the determination unit 31, and when the notification indicating that the sleep condition of the relay device 101A is satisfied is received from the determination unit 31, the NM processing unit 51 stops broadcasting the NM message irrespective of whether or not the sleep condition of the vehicle speed sensor 121 is satisfied.

Alternatively, a configuration is also possible in which the NM processing unit 51 broadcasts the NM message in a state where at least either the sleep condition of the relay device 101A or the sleep condition of the vehicle speed sensor 121 is not satisfied, and stops broadcasting the NM message in a state where the sleep condition of the relay device 101A and the sleep condition of the vehicle speed sensor 121 are satisfied.

The vehicle speed sensor 121 may transition to the sleep state autonomously and independently of control by the control unit 41. A configuration is also possible in which, when communication between the relay device 101A and the vehicle speed sensor 121 is not performed for a predetermined period, the NM processing unit 51 determines that the vehicle speed sensor 121 has transitioned to the sleep state autonomously and stops transmitting the NM message instead of the vehicle speed sensor 121.

In the in-vehicle communication system 301 according to the embodiment of the present disclosure, the NM processing unit 51 does not transmit the NM message instead of the vehicle speed sensor 121 in the case where the vehicle speed sensor 121 has not been authenticated, but there is no limitation to this configuration. A configuration is also possible in which the NM processing unit 51 broadcasts the NM message instead of the vehicle speed sensor 121 irrespective of whether or not the vehicle speed sensor 121 has been authenticated.

In the in-vehicle communication system 301 according to the embodiment of the present disclosure, the control unit 41 performs control for causing the vehicle speed sensor 121 to recover from the sleep state, but there is no limitation to this configuration. A configuration is also possible in which the control unit 41 performs control for causing the vehicle speed sensor 121 to transition to the sleep state, but does not perform control for causing the vehicle speed sensor 121 to recover from the sleep state.

In the in-vehicle communication system 301 according to the embodiment of the present disclosure, in the case where noncompliance information is included in an authentication frame received from the vehicle speed sensor 121 via the communication port 15C and the relay unit 11, the detection unit 21 determines that the vehicle speed sensor 121 that has transmitted the authentication frame does not support the NM message, but there is no limitation to this configuration. A configuration is also possible in which the detection unit 21 detects an in-vehicle device that does not comply with the AUTOSAR as described below.

For example, the communication port 15C is set in advance as a communication port 15 to which a device that does not comply with the AUTOSAR is connected. When an authentication frame is received from the vehicle speed sensor 121 via the communication port 15C and the relay unit 11, the detection unit 21 determines that the vehicle speed sensor 121 that has transmitted the LLDP frame does not support the NM message.

Alternatively, the detection unit 21 monitors the communication port 15C, and when the vehicle speed sensor 121 is connected to the communication port 15C, the detection unit 21 detects the link-up of the communication port 15C. Then, the detection unit 21 determines whether or not a microcontroller included in the vehicle speed sensor 121 is operating through transmission and reception of an ICMP frame that conforms to the ICMP (Internet Control Message Protocol) or an ARP frame that conforms to the ARP (Address Resolution Protocol) between the vehicle speed sensor 121 and the detection unit 21 via the relay unit 11 and the communication port 15C. When the NM processing unit 51 does not receive the NM message from the vehicle speed sensor 121 although the microcontroller included in the vehicle speed sensor 121 is operating, the detection unit 21 determines that the vehicle speed sensor 121 does not support the NM message.

In the in-vehicle communication system 301 according to the embodiment of the present disclosure, the control unit 41 transmits an Ethernet frame including the sleep transition instruction via the relay unit 11 and the communication port 15C to the vehicle speed sensor 121, but there is no limitation to this configuration. A configuration is also possible in which the control unit 41 performs control for stopping power supply to the vehicle speed sensor 121 rather than transmitting an Ethernet frame including the sleep transition instruction via the relay unit 11 and the communication port 15C to the vehicle speed sensor 121.

In the in-vehicle communication system 301 according to the embodiment of the present disclosure, the control unit 41 transmits an Ethernet frame including the wake-up transition instruction via the relay unit 11 and the communication port 15C to the vehicle speed sensor 121, but there is no limitation to this configuration. A configuration is also possible in which the control unit 41 performs control for supplying power to the vehicle speed sensor 121 rather than transmitting an Ethernet frame including the wake-up transition instruction via the relay unit 11 and the communication port 15C to the vehicle speed sensor 121.

In the in-vehicle communication system 301 according to the embodiment of the present disclosure, the relay device 101A performs control for causing the vehicle speed sensor 121 to transition to the sleep state and control for causing the vehicle speed sensor 121 to transition to the wake-up state, but there is no limitation to this configuration. A configuration is also possible in which the relay device 101B performs control via the relay device 101A instead of the relay device 101A to cause the vehicle speed sensor 121 to transition to the sleep state and cause the vehicle speed sensor 121 to transition to the wake-up state.

In the in-vehicle communication system 301 according to the embodiment of the present disclosure, the detection unit 21 detects the vehicle speed sensor 121 that is an in-vehicle device added to the in-vehicle communication system 301 as the target device, but there is no limitation to this configuration. A configuration is also possible in which the detection unit 21 detects an in-vehicle device already included in the in-vehicle communication system 301 as the target device. That is, a configuration is also possible in which the detection unit 21 detects an in-vehicle device that is included in the in-vehicle communication system 301 at the time of shipment of the vehicle 1, as the target device.

In the in-vehicle communication system 301 according to the embodiment of the present disclosure, the detection unit 21 detects an in-vehicle device that does not comply with the AUTOSAR, as the target device, but there is no limitation to this configuration. For example, a configuration is also possible in which the detection unit 21 detects an in-vehicle device that does not comply with the OSEK, which is an example of an in-vehicle network management method, as the target device. That is, a configuration is also possible in which the detection unit 21 detects an in-vehicle device that does not support a predetermined message that conforms to the OSEK, as the target device.

In the in-vehicle communication system 301 according to the embodiment of the present disclosure, the detection unit 21 detects the vehicle speed sensor 121 as the target device, but there is no limitation to this configuration. A configuration is also possible in which the detection unit 21 detects an in-vehicle device other than the vehicle speed sensor 121, such as a camera, as the target device.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes features described in the following supplementary note.

An in-vehicle management device including: a detection unit configured to detect the presence of a target device that is an in-vehicle device that does not support a predetermined message among in-vehicle devices included in an in-vehicle network; a determination unit configured to determine whether or not a sleep condition of the target device detected by the detection unit is satisfied: and a control unit configured to perform control for causing the target device to transition to the sleep state in a case where it is determined by the determination unit that the sleep condition is satisfied.

The invention claimed is:

1. An in-vehicle management device comprising:
   a detection unit configured to detect the presence of a target device that is an in-vehicle device that does not support a predetermined message among in-vehicle devices included in an in-vehicle network; and
   a control unit configured to perform control for causing the target device detected by the detection unit to transition to a sleep state when a state where the predetermined message from the in-vehicle devices does not arrive at the in-vehicle management device has continued for a predetermined period.

2. The in-vehicle management device according to claim 1, further comprising:
   a determination unit configured to determine whether or not a sleep condition of the target device is satisfied,
   wherein, in a case where it is determined by the determination unit that the sleep condition is satisfied and the state where the predetermined message from the in-vehicle devices does not arrive at the in-vehicle management device has continued for the predetermined period, the control unit performs control for causing the target device to transition to the sleep state.

3. The in-vehicle management device according to claim 1, further comprising:
   a determination unit configured to determine whether or not a sleep condition of the target device is satisfied; and
   a transmission unit configured to transmit the predetermined message instead of the target device to the in-vehicle devices included in the in-vehicle network in a case where it is determined by the determination unit that the sleep condition is not satisfied.

4. The in-vehicle management device according to claim 3, further comprising:
   an authentication processing unit configured to perform authentication processing for authenticating the target device detected by the detection unit,
   wherein, in a case where the target device has been authenticated by the authentication processing unit, the transmission unit transmits the predetermined message instead of the target device to the in-vehicle devices.

5. The in-vehicle management device according to claim 1,
   wherein, when a wake-up condition of the target device is satisfied or the in-vehicle management device has received the predetermined message from any of the in-vehicle devices, the control unit performs control for causing the target device to recover from the sleep state.

6. A management method performed by an in-vehicle management device, the management method comprising:
   a step of detecting the presence of a target device that is an in-vehicle device that does not support a predetermined message among in-vehicle devices included in an in-vehicle network; and
   a step of performing control for causing the detected target device to transition to a sleep state when a state where the predetermined message from the in-vehicle devices does not arrive at the in-vehicle management device has continued for a predetermined period.

* * * * *